US006826515B2

(12) United States Patent
Bernardi et al.

(10) Patent No.: US 6,826,515 B2
(45) Date of Patent: Nov. 30, 2004

(54) HEADSET NOISE EXPOSURE DOSIMETER

(75) Inventors: Robert J. Bernardi, Scotts Valley, CA (US); Paul A. Ewer, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 337 days.

(21) Appl. No.: 10/061,421

(22) Filed: Feb. 1, 2002

(65) Prior Publication Data

US 2003/0191609 A1 Oct. 9, 2003

(51) Int. Cl.[7] .............................................. G06F 15/00
(52) U.S. Cl. .................... 702/191; 379/387.01
(58) Field of Search ............................. 702/57, 58, 64, 702/65, 68, 69, 75, 79, 80, 107, 109, 118, 119, 120–123, 126, 189–195; 379/387.01, 250, 214, 381, 72; 250/214; 381/72

(56) References Cited

U.S. PATENT DOCUMENTS

| 2,884,085 | A | * | 4/1959 | Von Wittern ................. 73/647 |
| 3,747,703 | A | | 7/1973 | Knowd ......................... 73/648 |
| 3,977,257 | A | | 8/1976 | Steger .......................... 73/648 |
| 4,003,264 | A | | 1/1977 | Erlandsson et al. ........... 73/647 |
| 4,073,194 | A | * | 2/1978 | Willson et al. ................ 73/646 |
| 4,307,385 | A | | 12/1981 | Evans et al. .................. 340/540 |
| 4,554,639 | A | * | 11/1985 | Baker et al. .................... 702/1 |
| 5,072,415 | A | * | 12/1991 | Cannelli et al. ................ 702/1 |
| 5,701,352 | A | * | 12/1997 | Williamson, III ............ 381/104 |
| 6,114,687 | A | * | 9/2000 | Sharp et al. ............ 250/214 AL |
| 6,396,930 | B1 | * | 5/2002 | Vaudrey et al. ................ 381/60 |
| 6,442,279 | B1 | * | 8/2002 | Preves et al. .................. 381/72 |
| 6,456,199 | B1 | * | 9/2002 | Michael ..................... 340/573.1 |
| 6,507,650 | B1 | * | 1/2003 | Moquin .................. 379/387.01 |

FOREIGN PATENT DOCUMENTS

| EP | 0095902 A | 12/1983 |
| EP | 0 095 902 | 12/1983 |
| EP | 0578604 A | 1/1994 |
| EP | 0 578 604 | 1/1994 |
| GB | 2 349 466 | 11/2000 |
| GB | 2349466 A | 11/2000 |

* cited by examiner

*Primary Examiner*—Marc S. Hoff
*Assistant Examiner*—Mohamed Charioui
(74) *Attorney, Agent, or Firm*—Peter Hsieh

(57) ABSTRACT

A method and apparatus for monitoring and controlling exposure to noise related to a headset are described. The method includes sampling an input sound signal to produce samples of the input sound signal, calculating from these samples a headset sound level corresponding to the input sound signal, calculating cumulative exposure of a headset user to the headset sound level at a specific point in time, and calculating a gain adjustment for the input sound signal to ensure that the total sound to which the headset user will be exposed during a selected time period is within the regulatory maximum level. Advantageously, the method and apparatus of the present invention allow accurate real-time monitoring of cumulative exposure to headset noise and real-time adjustment of headset gain to ensure compliance with regulatory maximum sound exposure levels.

49 Claims, 3 Drawing Sheets

HEADSET NOISE EXPOSURE DOSIMETER

BACKGROUND

1. Field of the Invention

This invention generally relates to a method and an apparatus for monitoring and controlling noise and, more particularly, to a method and an apparatus for monitoring and controlling exposure to noise related to a headset.

2. Description of Related Art

In a work environment, the accumulated amount of noise, or dose in terms of an average noise level, and the maximum level of noise to which an individual has been exposed during a workday are important to occupational safety and to the health of the individual. Industry and governmental agencies in countries throughout the world, such as the Occupational Safety and Health Administration (OSHA) in the United States, require accurate noise data measurements.

Examples of such noise data measurements include impulse noise, continuous noise, and an eight-hour time-weighted average ("TWA"). Impulse noise relates to noise of very short duration, less than a few thousandths of a second, which also repeats less than once a second. Continuous noise relates to noise that is longer in duration than impact noise, extending over seconds, minutes, or hours. Eight-hour TWA relates to the average of all levels of impulse and continuous noise to which an employee is exposed during an eight-hour workday. The OSHA maximum level for impulse noise is 140 dBSPL measured with a fast peak-hold sound level meter ("dBSPL" stands for sound pressure level, or a magnitude of pressure disturbance in air, measured in decibels, a logarithmic scale). The maximum level for continuous noise is 115 dBA (read on the slow average "A" scale). OSHA regulations limit an eight-hour TWA to 90 dBA. If employees are exposed to eight-hour TWAs between 85 and 90 dBA, OSHA requires employers to initiate a hearing conservation program which includes annual hearing tests.

Among the many noise sources that are encountered in the workplace, measuring the exposure to noise related to telephone headsets is especially problematic. Telephone headsets generate their sound levels at or in the user's ear canal rather than external to the user. The external sound field levels referred to in many governmental regulations cannot be directly compared to these headset sound levels.

Also, headset users in the workplace typically have jobs requiring either that they spend a substantial amount of time on the phone, or that their hands be free to perform other tasks. Since the headset user's speaker is held in or against the user's ear, the user requires more time to respond to any irritating tones or noises by moving the speaker further away from the ear than one typically does with a regular telephone handset. Exposure to impulsive sounds and short duration tones can be capped by protective devices such as forward breakdown diodes. However, there is currently no method to easily measure and control day long exposure from a headset. While telephone signals generally do not approach TWA limits, new sources of signal input are becoming available to users of telephone headsets. For example, headsets used for telephony may also be connected to a computer, allowing access to music sources. Some individuals may listen to music at levels much higher than the voice signals of typical telephone systems. As such, a headset user is exposed to varying levels of sound pressure over varying lengths of time with no capability of assuring real-time compliance with average noise exposure limits set by OSHA or other governmental regulations. Previously, remedial measures have generally been implemented after exposure to excessive noise and thus, there has been no prior method or apparatus to assure real-time compliance with threshold limits.

Therefore, there is a need in the art for a headset audio dosimeter that monitors the aforementioned data related to noise exposure levels in real time and that also controls the noise exposure to the headset user in real time to comply with governmental regulations and ensure user safety.

SUMMARY

In accordance with the present invention, a method and an apparatus are provided for monitoring and controlling exposure to noise related to a headset apparatus. A method for monitoring audio dosage from a headset includes sampling an input sound signal, calculating a headset sound level based on the input sound signal samples, and calculating the cumulative exposure of the headset user to the headset sound level at a specific point in time. These calculations are repeated to update the measure of the user's cumulative exposure to sound during the time that the user is wearing the headset. Advantageously, the present invention accurately monitors in real time audio dosage related to a headset apparatus.

In another aspect of the invention, a method for controlling audio dosage from a headset includes sampling an input sound signal, calculating a headset sound level from the sound signal samples, calculating real-time exposure to the headset sound level, extrapolating exposure to the end of a time period, calculating a gain adjustment for the input sound signal, and adjusting the gain of the headset to control the amplitude of the input sound signal. Advantageously, the present invention allows real-time compliance with regulatory threshold levels for exposure to noise. In addition, the invention may incorporate the ability to restrict impulse noise and short term tones to levels below regulatory limits.

In another aspect of the invention, a headset audio dosimeter includes a sampler means, a technique for calculating a headset sound level, a technique for calculating real-time exposure to the headset sound level, and a technique for calculating a gain adjustment to apply to the input sound signal.

In yet another aspect of the invention, a headset audio dosimeter system for processing an input sound signal from a source includes a sampler, a processor, a memory, a program with instructions stored in the memory that calculates not only a headset sound level but also real-time exposure to the headset sound level and a gain adjustment for the headset, gain adjust circuitry for adjusting the gain of the headset in response to the gain adjustment output by the program, and a headset apparatus.

Advantageously, the present invention accurately monitors cumulative dosage to sound related to a headset apparatus and calculates periodic gain adjustments, if necessary, to remain in compliance with regulatory threshold levels for exposure to noise.

These and other features and advantages of the present invention will be more readily apparent from the detailed description of the embodiments set forth below taken in conjunction with the accompanying drawings.

DETAILED DESCRIPTION

In accordance with an embodiment of the invention, a sampled analog audio signal is digitized and processed by a computer using techniques to monitor by calculation the actual free field equivalent output of a headset receiving the analog signal. The analog audio signal is then adjusted prior to being sent to the headset apparatus to conform to legal exposure requirements.

Figure 1:
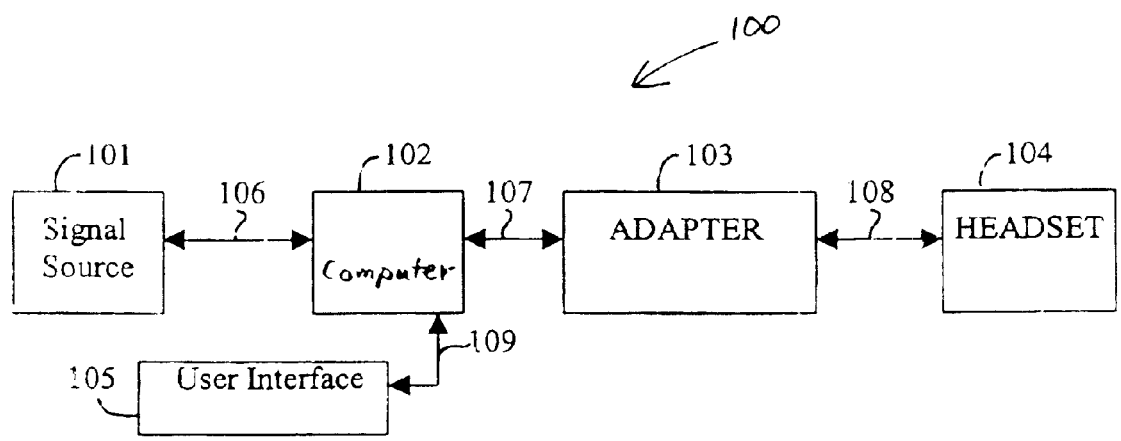
FIG. 1 is a general block diagram of an embodiment of a headset audio dosimeter system in accordance with the present invention.

FIG. 1 shows a simplified block diagram of one embodiment of headset audio dosimeter system 100 of the present invention. In this embodiment, a signal source 101, such as a public switched telephone network (PSTN), is operably connected to a computer 102, which receives an analog input audio signal along lead 106 from source 101. However, the invention is not limited to a PSTN signal source and may receive an audio signal from any audio signal source, for example, a CD player accessed through a personal computer, or any other signal source which can be connected to a headset.

Computer 102 calculates the cumulative real-time exposure by a headset user to the input audio signal over a time period and also calculates a gain adjustment for the input audio signal such that the cumulative sound to which the user is exposed through the headset remains in compliance with OSHA requirements or other user-selected exposure limits. The invention is not limited to a particular computer receiving and processing the input signal but any peripheral device with a processor, memory, and corresponding circuitry can be used as an alternative to computer 102, such as a telephone, a cellular telephone, a headset adapter, or a headset apparatus.

Computer 102 feeds the input audio signal and the calculated gain adjust signal into a Universal Serial Bus (USB) port, located within computer 102 in this embodiment. Digital data is sent along lead 107 to headset adapter 103, which acts as an adapter and amplifier with gain circuitry in this embodiment. Headset adapter 103 is an adapter to one headset apparatus or alternatively may act as an adapter to fit a wide range of headset apparatus.

Headset adapter 103 is operably connected to headset apparatus 104, which receives the adjusted input signal on lead 108 and converts it to an acoustic signal to be heard by the headset user. As noted above, several different versions of headset apparatus 104 may be used in conjunction with headset adapter 103 to give the user a choice of headset apparatus to wear. Headset apparatus 104 can be any adaptable headset apparatus such as the Encore series commercially available from Plantronics, Inc., located in Santa Cruz, Calif.

A user interface 105 is operably connected to computer 102 through lead 109 to allow for user adjustments to the gain adjust signal sent to headset adapter 103 and for entering calculation parameters, passwords, and other optional data. Manual interfaces such as a keyboard or mouse and visual display unit (VDU) may be used.

Figure 2A:
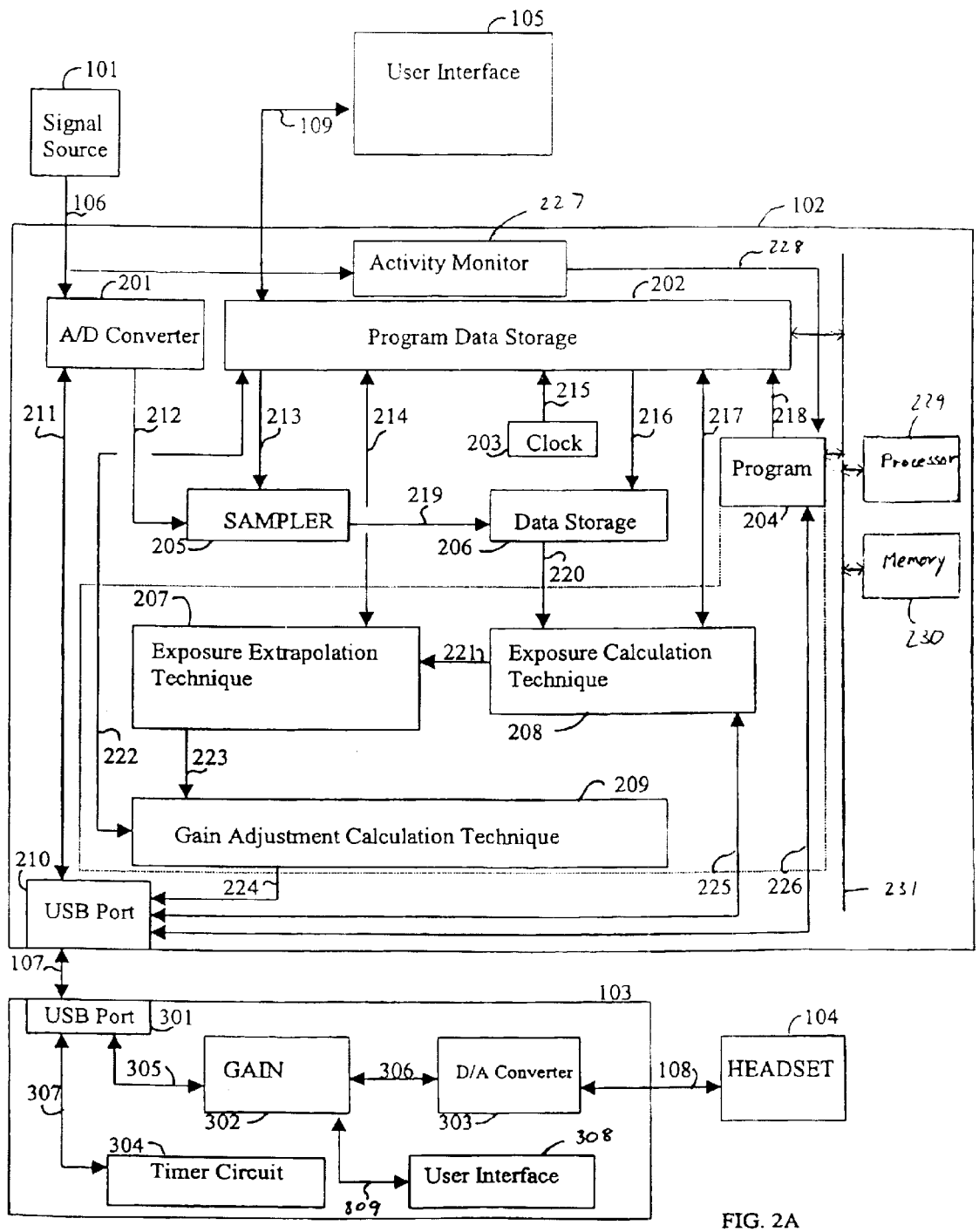
FIG. 2A is a block diagram of the electrical components of a headset audio dosimeter in accordance with the present invention.
Figure 2B:
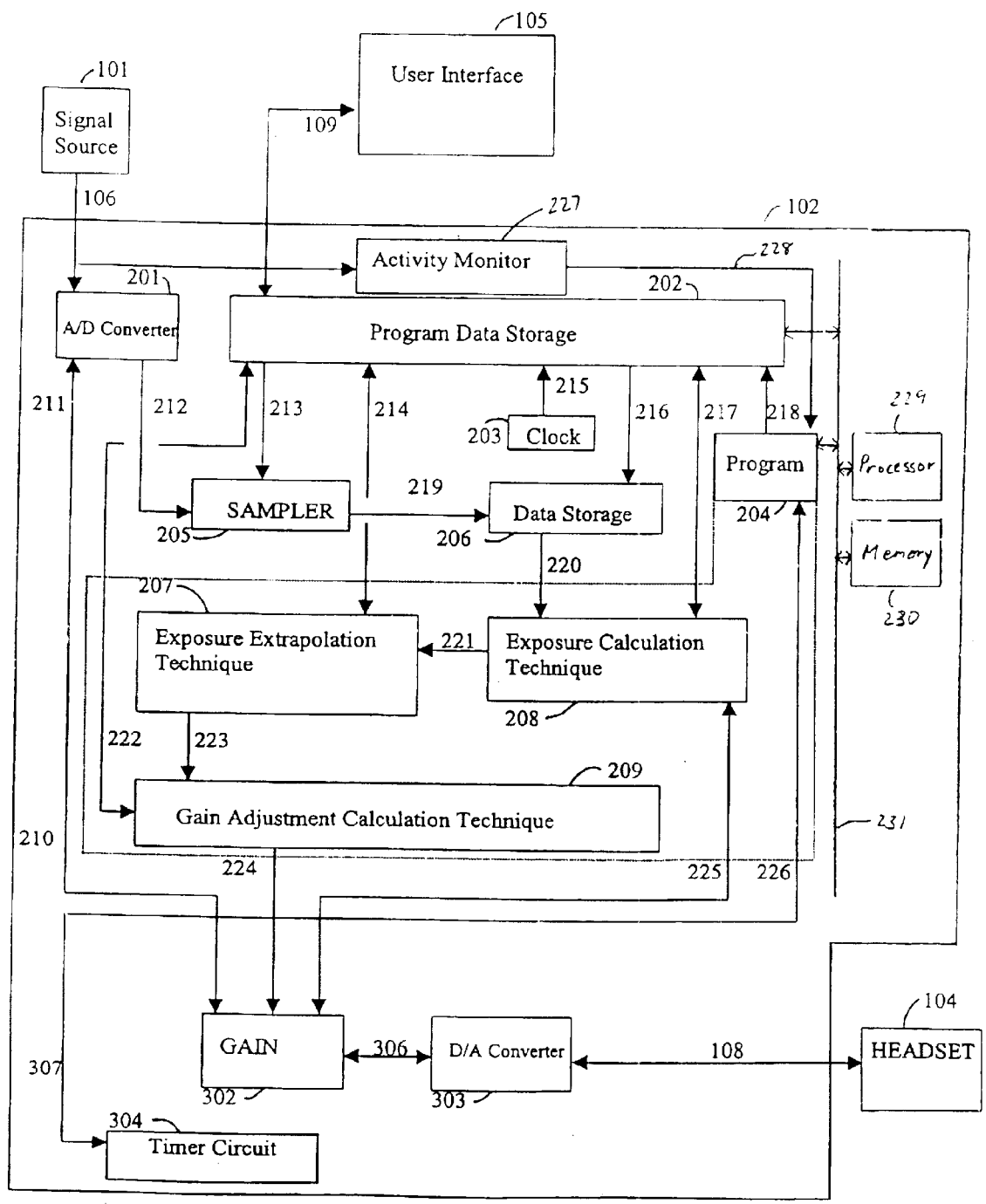
FIG. 2B is a block diagram of the electrical components in an alternative embodiment of the headset audio dosimeter in accordance with the present invention.

While communication channels within FIGS. 1, 2A, and 2B will be referred to as leads, it should be understood that what are called leads can be buses capable of carrying a plurality of signals (either digital or analog as appropriate) in parallel or can even be wireless communication channels.

FIG. 2A shows a block diagram of the electrical components used in computer 102 and headset adapter 103 in accordance with the present invention. Computer 102 includes a processor 229 and a memory 230 for processing and storing noise exposure program 204 of the present invention and related data. In one embodiment, processor 229 and memory 230 are connected to components in computer 102 through data bus 231. Processor 229 may be any suitable processor or other means for receiving digitized audio component signals and calculating sound and exposure levels. The processor or other means may also be capable of implementing lookup tables as described in further detail below. Memory 230 holding program 204 may be any suitable computer memory device such as a dynamic random access memory (DRAM) device or the hard drive of the computer. Even a read-only memory (ROM) device can be used to hold program 205 with the understanding that the program is fixed until the ROM is reprogrammed, if the ROM is of the reprogrammable type, such as an electrically erasable programmable read-only memory (EEPROM).

An analog to digital (A/D) converter 201 in computer 102 receives an analog input audio signal along lead 106 from an audio signal source 101, in this embodiment a PSTN, and converts the signal into digital words. A/D converter 201 may be any suitable means for decoding and digitizing analog audio signals. A/D converter 201 sends the digital data along lead 212 to sampler 205 which then samples the digitized input signal. Optionally, specific frequency bands may be selected by the user for sampling. In one embodiment, a constant standard sampling rate is selected, such as one second of data every sixty seconds, based upon the availability of memory. In an alternative embodiment, the sampling rate varies depending upon the activity level on the incoming lead from signal source 101. A faster sampling rate is utilized when signals are sent from signal source 101 above a certain threshold level and a slower sampling rate is utilized when there is minimal activity on input lead 106. Further, a threshold limit for digitizing may be used to improve computational speed by decreasing the number of samples which need to be digitized. Typically, authorities are not concerned with sound below approximately 70 dBSPL and thus, a cutoff can be established for digitizing samples only above a selected amplitude threshold.

Data storage 206, for storing the digital representations of the input audio signals taken by sampler 205, is connected to sampler 205 by lead 219. Data storage 206 is a subset of memory within computer 102 and may be any suitable computer memory device such as a DRAM device or the hard drive of the computer.

Program data storage 202 is another subset of memory within computer 102. Program data storage 202 stores the program parameters and lookup tables for use in calculations by program 204 as described in more detail below. Examples of such parameters include threshold limits for impulse noise, continuous noise, and an eight-hour time-weighted average, weighting factors (such as 3–6 dB trading relationships), durational time over which the cumulative exposure to noise of the headset user is to be calculated (typically 8 hours), and headset type. Optionally, user interface 105 is electrically connected to program data storage 202 to allow the aforementioned parameters and criteria levels to be entered by the user. In one embodiment, program data storage 202 contains preset threshold levels and a preset sampling time period when installed, which could be reset to an alternative maximum exposure level and usage time by the user or designated employee. In another embodiment, these features may be disabled or password protected upon installation to remove the ability of the headset user to over-ride or change the default parameters. Alternatively, unless prohibited, these features may be adjusted by the headset user at any time during use. Program data storage 202 may be any suitable computer memory device such as a DRAM device or the hard drive of the computer.

Upon startup of sampling or the application, the current time and date are taken from an internal clock 203 of computer 102. Clock 203 sends clock and date signals to program data storage 202 along lead 215 for later calculation of the elapsed time over which the input audio signals have been sampled. Alternatively, if an internal clock is not available, a timer circuit 304 in headset adapter 103 may be used for a time measurement. As discussed below, a time measurement is required for the exposure calculations.

Further, signals from clock 203 can be used for reset purposes upon completion of a preselected time period for sampling. For example, if the headset audio dosimeter is set to operate from 8 am to 5 pm daily, signals from clock 203 allow program 204 to reset after 5 pm is reached.

In one embodiment, when a specific durational time and date are not specified by the user, activity monitor 227 is used to determine when speech begins from audio signal source 101. Thus, depending upon voice signals being sent from signal source 101, activity monitor 227 sends a signal along lead 228 to program 204 to either turn on or pause timer circuit 304.

In another embodiment, program 204 may include a different pause feature. The pause feature is activated by the user through user interface 105 during periods when the user is away from the headset for prolonged periods of time, such as during a lunch break. During this time, the headset audio dosimeter will be set to record a nominal background noise level, for example, 60 dBSPL at all frequencies. Calls will be put on hold or dropped when the user pauses the program.

Program 204 of the present invention includes three techniques for calculating a real-time exposure level, extrapolating the exposure level to the end of a durational time period, and calculating a gain adjustment if necessary to comply with exposure limits. At predetermined intervals, for example 5 minutes, the sound exposure level at headset 104 is calculated and the gain adjusted if appropriate. The predetermined interval may be a preset interval upon installation of the program with an option for the user to change the interval depending upon memory constraints. Within each predetermined interval, computer 102 performs a set of numerical integrations to yield the exposure level up to that time.

As previously noted, all noise exposure regulations are based on measurements made in free field as opposed to at the eardrum. Because the ear canal is resonant to and is more sensitive to certain frequencies, a free field measurement must be translated to sound level at the eardrum and vice versa. Laboratory telephone headset sound level measurements duplicate ear canal or ear drum levels using ear simulators. By knowing the input signal, the conditioning applied by the headset with its unique coupling to the eardrum and electrical sensitivity, and the frequency response of the headset speaker on an artificial ear, such as a P.57 artificial ear, it is possible to monitor the signal and build up, over time, an average free field sound pressure level equivalent by calculation. Optionally, table readouts of the transfer function between electrical signal and acoustical load at the ear for the range of adaptable headsets may be used for calculating exposure.

Further, exposure calculation technique 208 used with this invention will be configurable to different countries' limits and interpretations of noise exposure based upon different weighting factors. Weighting refers to the technique of giving louder noises greater weight in calculating the average exposure. For example, OSHA uses a 5 dB trading relationship such that every increase of 5 dB is weighted twice as much in terms of exposure time. In Europe, the trading relationship is generally 3 dB for double the exposure time. Thus, a one hour exposure at 85 dBA is weighted the same as a two hour exposure at 80 dBA with a 5 dB trading relationship. In one embodiment, the user will be able to enter a trading relationship between approximately 3 dB to approximately 6 dB for doubling exposure time, depending upon jurisdictional interpretation of noise exposure.

Data from several sources is transmitted to exposure calculation technique 208 to calculate real-time noise exposure to a headset user. Exposure calculation technique 208 uses data from data storage 206 and program data storage 202. Data storage 206 provides data along lead 220 regarding the sampled input signal. Program data storage 202 provides data along lead 217 regarding calculation parameters, such as threshold levels and durational time periods. Exposure calculation technique 208 operates on the data gathered over the predetermined period using clock 203 or timer circuit 304 as a reference. In addition to the sampled data and durational time period, exposure calculation technique 208 uses data regarding the speaker frequency response and the electrical sensitivity of the headset apparatus provided through program data storage 202 along lead 217. Data regarding system gain with any gain adjustments made by the user is provided through user interface 105 and/or user interface 308.

An example of the technique for calculating real-time exposure follows. The response of a particular headset at the ear drum reference point (DRP) is known at various frequencies, stated in dBSPL/V (sound pressure level in decibels/voltage) at one-third octaves from 100 Hz to 8 kHz. The headset response is "A" weighted by adding to the response a selected value, and then the sum is transferred to the free field from the DRP with an offset. Table 1 below is an example of a lookup table for calculating the output in free field from a typical headset apparatus, showing as a function of frequency, the frequency response of a headset at DRP, an "A" weighting curve offset to be added to the headset response, and the transfer function offset from DRP to free field, to also be added to the response.

TABLE 1

| Frequency (Hz) | Typical Frequency Response of a Headset at DRP (dBSPL/V) | "A" Weighting Curve Offset (dB) | Transfer Function DRP to Free Field Offset (dB) |
| --- | --- | --- | --- |
| 100 | 95 | −19.1 | 0.00 |
| 125 | 97 | −16.1 | 0.00 |
| 160 | 100 | −13.4 | 0.13 |
| 200 | 103 | −10.9 | 0.20 |
| 250 | 104 | −8.6 | −0.01 |
| 315 | 104 | −6.6 | −0.11 |
| 400 | 104 | −4.8 | 0.27 |
| 500 | 103.5 | −3.2 | −0.13 |
| 630 | 103.5 | −1.9 | −0.48 |
| 800 | 103.5 | −0.8 | −1.01 |
| 1000 | 104 | 0.0 | −1.83 |
| 1250 | 107 | 0.6 | −2.80 |
| 1600 | 115 | 1.0 | −5.29 |
| 2000 | 121 | 1.2 | −7.84 |
| 2500 | 120 | 1.3 | −10.27 |
| 3150 | 120 | 1.2 | −15.11 |
| 4000 | 106 | 1.0 | −15.57 |

TABLE 1-continued

| Frequency (Hz) | Typical Frequency Response of a Headset at DRP (dBSPL/V) | "A" Weighting Curve Offset (dB) | Transfer Function DRP to Free Field Offset (dB) |
|---|---|---|---|
| 5000 | 101 | 0.5 | −12.73 |
| 6300 | 92 | −0.1 | −7.53 |
| 8000 | 92 | −1.1 | −0.53 |

In one embodiment, the output at each frequency in free field (output$_i$), calculated from a lookup table such as Table 1 above, is averaged over the elapsed time period, taking into consideration the system gain. The default system gain is known and any adjustments to the system gain are recorded and known. The averaged output at each frequency is then used in the following equation to determine the free field equivalent exposure level (LEQ) in dBA:

$$LEQ(dBA) = 10 \left\{ \text{Log}_{10} \left[ \sum_{i=100}^{8000} 10^{\wedge}(output_i) \right] \right\} \quad \text{(Equation 1)}$$

where LEQ=free field equivalent exposure level, and
output$_i$=free field output at each frequency from i=100 Hz to i=8000 Hz.

In another embodiment, the output at each frequency in free field is averaged over the predetermined interval, such as 5 minutes. The averaged output at each frequency is used in Equation 1 to determine the free field equivalent exposure level in the interval time frame. The exposure level in the interval time frame is stored in program data storage 202. Exposure calculation technique 208 then calculates the free field equivalent exposure level by averaging all the accumulated interval exposure levels calculated to date, retrieved from program data storage 202, to generate a real-time exposure level.

The calculated real-time free field equivalent exposure level, together with the elapsed time period, is then stored in program data storage 202 via lead 217 for future use by exposure calculation technique 208 during the next interval. The real-time exposure level is also sent on lead 221 to exposure extrapolation technique 207.

Exposure extrapolation technique 207 determines what the final free field exposure level will be over the specified durational time period (typically 8 hours) if no changes are made to the system gain. In one embodiment, the real-time exposure level calculated from exposure calculation technique 208, sent along lead 221, is averaged with the real-time exposure level from the last interval, retrieved from program data storage 202 along lead 214, based upon the assumption that the latest exposure level remains constant throughout the durational time period with updated values at each calculation interval.

In another embodiment, exposure extrapolation technique 207 extrapolates the real-time exposure level at a calculated rate change of exposure. The calculated rate change of exposure may be based upon the difference in calculated exposure level at two or more interval periods and the interval time period. For example, a step function may be used such that if there is a small change in exposure level, ranging from approximately 0 dBA to 5 dBA, the rate change of exposure is assumed to be zero and exposure extrapolation technique 207 extrapolates the real-time exposure level to the end of the preselected durational period holding the exposure level constant, with a multiplier factor of 1.0. If there is a change in exposure level greater than approximately 5 dBA, the real-time exposure level may be extrapolated at a higher rate than a zero rate change, such as a 1.1 multiplier factor to the exposure level. Other extrapolation techniques, such as linear and nonlinear regression, may also be used to determine a rate change of exposure. The calculated extrapolated exposure level is then sent to gain adjustment calculation technique 209 along lead 223.

Gain adjustment calculation technique 209 calculates a gain adjustment for the input sound signal to allow for continuing use of the headset apparatus in compliance with maximum exposure threshold levels. Gain adjustment calculation technique 209 receives data regarding the exposure level calculated by exposure extrapolation technique 207 from lead 223 and time period data from program data storage 202 along lead 222. If the extrapolated exposure level is higher than the maximum exposure limit set through the software or by the user, gain adjustment calculation technique 209 calculates an appropriate gain level where the maximum exposure will not be exceeded. The system gain stored in program data storage 202 is reset through lead 222 to be in conformity with the new system gain calculated by gain adjustment calculation technique 209 for future reference in the next interval calculation.

The following equations are used to determine a reduction in gain for the system and a new system gain:

$$Gain_{reduction}(\text{dB}) = Exposure_{calculated} - \frac{[(Exposure_{max} \times T_{total}) - (Exposure_{calculated} \times T_{elapsed})]}{(T_{total} - T_{elapsed})}$$

where Gain$_{reduction}$=system gain reduction
Exposure$_{calculated}$=extrapolated exposure level
Exposure$_{max}$=preselected maximum exposure level
T$_{total}$=preselected durational time
T$_{elapsed}$=elapsed time for sampling
and $$Gain_{new}(\text{dB}) = Gain_{system} - Gain_{reduction}$$

where Gain$_{new}$=new system gain
Gain$_{system}$=current system gain

In one example, the preselected maximum exposure level (Exposure$_{max}$) is set at 80 dBA, the preselected durational time (T$_{total}$) is set at 8 hours, and the extrapolated exposure (Exposure$_{calculated}$) has been calculated to be 83 dBA after an elapsed time (T$_{elapsed}$) of 2 hours. The current system gain (Gain$_{system}$) is at 12 dB. Thus, Gain$_{reduction}$ in this example, is calculated to be $$Gain_{reduction} = 83 - (80 \times 8 - 83 \times 2)/(8-2) = 4 \text{ dB}$$

and the new system gain is calculated to be $$Gain_{new} = 12 - 4 = 8 \text{ dB}.$$

Optionally, the time frame in which the input audio signal is adjusted depends on the magnitude of the calculated gain adjustment. For example, if the calculated gain adjustment is small, in the range of approximately 1 dB to approximately 2 dB, the attenuation can be made immediately since the change will not be readily noticed by the headset user. However, if the calculated gain adjustment is large, for example in the range of approximately 3 dB to approximately 6 dB, then a gradual step down over time following a step function can be used to make the change less noticeable to the headset user. However, a larger gain attenuation than the prior calculated gain adjustment will be required in this case to take into consideration the exposure during the step down time. In one example, if the system gain is required to be attenuated by 6 dB, then a gradual step down of 1.5 dB/minute may be set over the interval of 5 minutes.

As further shown in FIG. 2A, the gain adjust signal from gain adjustment calculation technique 209 and the digitized input audio signal from signal source 101 are sent to USB port 210 in computer 102 through leads 224 and 211, respectively. USB port 301 in headset adapter 103 receives data from USB port 210 along lead 107 and sends gain adjust data to gain circuitry 302 along lead 305. In this embodiment, headset adapter 103 includes a universal serial bus (USB) puck with a USB connection to computer 102. The USB puck is capable of being used with a wide range of headset apparatus and has a user interface 308 to allow for user gain adjustment. As is well known, the USB provides a ubiquitous link that can be used across a wide range of PC-to-telephone interconnects. The latest specification for USB can be found in "Universal Serial Bus Specification Revision 2.0," published in Apr. 27, 2000, available at http://developer.intel.com/technology/usb/spec.htm. Although in this embodiment a USB port is used in computer 102 and headset adapter 103, other well-known peripheral interfaces may be used, such as SCSI and UltraIDE interfaces.

Gain circuitry 302 then attenuates the digitized input signal from signal source 101 in conformity with the gain adjust signal from gain adjustment calculation technique 209 so that the total noise to which the user has been and will be exposed, based on the past and current measurements, does not exceed the specified exposure limits. Gain adjusts are not frequency dependent. The gain of the whole signal is reduced by the same amount to maintain the selected frequency response. Gain circuitry 302 then sends the adjusted audio signal along lead 306 to digital to analog (D/A) converter 303 for conversion of the digital signal to an analog signal. D/A converter 303 may be any suitable device for converting digital audio signals to analog audio signals. Finally, the analog signal is sent along lead 108 to headset apparatus 104, where it is converted into an acoustic signal which is heard by the user.

Although in the previously described embodiments, gain and frequency response circuitry are located in headset adapter 103, the invention is not limited to a particular headset adapter. Any apparatus that operably connects a headset to computer 102 and controls the gain of the signal to the headset apparatus may be used as an alternative to headset adapter 103. In other embodiments, such adapter features and gain adjust circuitry may be located within computer 102, a telephone, a cellular telephone, or any suitable peripheral device. In the embodiment shown in FIG. 2B, adapter features and gain adjust circuitry are located within computer 102.

In an alternative embodiment, headset apparatus 104 may receive digital signals. After gain circuitry 302 adjusts the digitized input signal based upon the gain adjust signal, the adjusted digital signal is directly sent to headset apparatus 104, where it is converted into an acoustic signal which is heard by the user. The adjusted digital signal bypasses D/A converter 303 in this embodiment.

Referring to FIGS. 2A and 2B, user interface 105 is operably connected to computer 102 and specifically is connected to program data storage 202 through lead 109. User interface 105 allows the user to enter calculation parameters such as threshold levels, weighting factors, durational time, and the type of headset apparatus chosen by the user. Further, user interface 105 allows for gain adjustments by the headset user. User interface 105 may include manual interfaces such as a keyboard or mouse and a visual display unit.

Referring to FIG. 2A, a user interface 308 is optionally connected to headset adapter 103 and specifically is connected to gain circuitry 302 through lead 309. User interface 308 allows the user to manually adjust the gain of the input signal being heard through the headset apparatus through headset adapter 103.

If the system gain is adjusted by the user, through either user interface 105 or 308, the system gain stored in program data storage 202 will be updated to correspond to such user adjustment. However, any gain adjustment that is desired by the user will first be compared to data from gain adjustment calculation technique 209 and could potentially be negated in order to comply with exposure limits. For example, if the user selects to increase the gain 3 dB but the gain adjustment calculated by gain adjustment calculation technique 209 allowed for an increase of only 1 dB, the system would not allow the user to make the full adjustment. The program will allow the user to make adjustments to decrease the gain or to increase the gain in accordance with the calculated gain adjustment, but the program will not allow the user to make adjustments increasing the gain in contradiction to the calculated gain adjustment.

In the alternative, there may be no user adjustable gain. A gain will be initially set by the host and will be adjusted absolutely by gain adjustment calculation technique 209.

Optionally, the audio dosimeter program will offer to save the data computed to a specific file in the memory. Data saved in program data storage 202 or data storage 206 may be automatically backed up if the option to save is not taken when the program is shut down or reset.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as falling within the true spirit and scope of this invention.

We claim:

1. A headset audio dosimeter, comprising:

sampling circuitry for sampling an input sound signal to produce samples of said input sound signal;

a headset sound level technique for calculating from said samples of said input sound signal a headset sound level corresponding to the input sound signal;

an exposure technique for calculating from said headset sound level the cumulative exposure of a user of a headset to the headset sound level;

an exposure extrapolation technique for extrapolating the expected cumulative exposure of the user to the headset sound level to the end of a preselected time period; and a gain adjustment technique for calculating a gain adjustment for the input sound signal to limit the total cumulative exposure of the user to sound over the preselected time period to below a selected value.

2. The headset audio dosimeter of claim 1, wherein the gain adjustment technique comprises:

structure for determining a time frame for gain adjustment depending upon the magnitude of the gain adjustment.

3. The headset audio dosimeter of claim 2, wherein the structure is capable of adjusting gain immediately for a small adjustment and over a longer time for a large gain adjustment.

4. The headset audio dosimeter of claim 3, wherein a small adjustment is in the range of approximately 1 dB to approximately 2 dB.

5. The headset audio dosimeter of claim 3, wherein a large adjustment is in the range of approximately 3 dB to approximately 6 dB.

6. The headset audio dosimeter of claim 1, wherein the sampling circuitry is capable of sampling the input sound signal at selected frequency bands and at selected sampling rates.

7. The headset audio dosimeter of claim 1, wherein the input sound signal is from a public switched telephone network.

8. The headset audio dosimeter of claim 1, wherein the headset sound level technique comprises a transfer function that includes a headset speaker frequency response factor, a headset electrical sensitivity factor, and a free field equivalency factor.

9. The headset audio dosimeter of claim 1, wherein the exposure technique comprises a weighting function that includes a trading relationship between exposure time and exposure level.

10. The headset audio dosimeter of claim 1, further comprising:
a user interface for allowing a user to select a trading relationship of between approximately 3 dB to approximately 6 dB for doubling exposure time.

11. The headset audio dosimeter of claim 1, wherein the exposure extrapolation technique comprises:
structure for calculating a rate of exposure change.

12. The headset audio dosimeter of claim 1, wherein the gain adjustment technique comprises:
structure for comparing between extrapolated exposure and regulatory threshold levels.

13. The headset audio dosimeter of claim 1, further comprising:
a user interface for allowing a user to select calculation parameters comprising regulatory threshold levels, weighting factors, time periods, headset apparatus type, and user gain adjustment levels.

14. The headset audio dosimeter of claim 1, further comprising:
a technique for determining levels of impulse noise and continuous noise.

15. The headset audio dosimeter of claim 1, further comprising:
a display to visually show sound measurement values comprising impulse noise, continuous noise, exposure levels, and gain adjustments.

16. A headset audio dosimeter system, comprising:
a sound signal source for producing an input sound signal;
means for sampling the input sound signal to produce samples of said input sound signal;
means for storing said samples;
a processor;
a program stored in a memory for allowing said processor to calculate from said samples a gain adjustment for the input sound signal, said gain adjustment including comparing extrapolated exposure to regulatory threshold levels;
gain control circuitry responsive to said calculated gain adjustment for adjusting gain of the input sound signal in conformity with the calculated gain adjustment to produce an adjusted sound signal; and
a headset apparatus to receive the adjusted sound signal.

17. The headset audio dosimeter system of claim 16, wherein said program comprises instructions to cause said processor to:
calculate a headset sound level corresponding to the input sound signal from said samples of said input sound signal;
calculate from the headset sound level the cumulative exposure of a user of a headset to the headset sound level;
extrapolate the expected cumulative exposure of the user to the headset sound level to the end of a preselected time period; and
calculate a gain adjustment for the input sound signal to limit the total cumulative exposure to sound of the user over the preselected time period to below a selected value.

18. The headset audio dosimeter system of claim 17, wherein the program further comprises instructions to cause said processor to:
determine a time frame for gain adjustment for the input signal depending upon the magnitude of gain adjustment.

19. The headset audio dosimeter system of claim 18, wherein structure is capable of adjusting gain immediately for a small adjustment and over a longer time for a large adjustment.

20. The headset audio dosimeter system of claim 19, wherein a small adjustment is in the range of approximately 1 dB to approximately 2 dB.

21. The headset audio dosimeter system of claim 19, wherein a large adjustment is in the range of approximately 3 dB to approximately 6 dB.

22. The headset audio dosimeter system of claim 17, wherein the program further comprises instructions to cause said processor to:
calculate a headset sound level using a transfer function that includes a headset speaker frequency response factor, a headset electrical sensitivity factor, and a free field equivalency factor.

23. The headset audio dosimeter system of claim 17, wherein the program further comprises instructions to cause said processor to:
calculate exposure to the headset sound level using a weighting function that includes a trading relationship between exposure time and exposure level.

24. The headset audio dosimeter system of claim 17, wherein the program further comprises instructions to cause said processor to:
extrapolate exposure to the end of a preselected time period at a calculated rate of exposure change; and
calculate a gain adjustment for the input sound signal by comparing extrapolated exposure to regulatory threshold levels.

25. The headset audio dosimeter system of claim 16, further comprising:
a headset adapter which operably connects a variety of headset apparatus to the gain adjust circuitry.

26. The headset audio dosimeter system of claim 25, wherein the headset adapter includes a user interface for allowing gain adjustment by the user.

27. The headset audio dosimeter system of claim 16, wherein the sound signal source comprises a public switched telephone network.

28. The headset audio dosimeter system of claim 16, wherein the sampling means samples the input sound signal at selected frequency bands and at selected sampling rates.

29. The headset audio dosimeter system of claim 16, further comprising:

a user interface for allowing a user to select a trading relationship of between approximately 3 dB to approximately 6 dB for doubling exposure time.

30. The headset audio dosimeter system of claim 16, further comprising:

a user interface for allowing a user to select calculation parameters comprising regulatory threshold levels, weighting factors, time periods, headset apparatus type, and user gain adjustment levels.

31. The headset audio dosimeter system of claim 16, wherein the program further comprises instructions to cause said processor to:

determine levels of impulse noise and continuous noise.

32. The headset audio dosimeter system of claim 16, further comprising:

a display to visually show sound measurement values calculated by the program comprising impulse noise, continuous noise, exposure levels, and gain adjustments.

33. A method for monitoring noise exposure from a headset comprising:

sampling an input sound signal to produce a plurality of samples as a function of time;

calculating from said plurality of samples a headset sound level corresponding to the input sound signal;

calculating real-time exposure of a user of the headset to the headset sound level; and extrapolating the real-time exposure to the end of a preselected time period.

34. The method of claim 33, wherein calculating real-time exposure to the headset sound level comprises using a weighting function that includes a trading relationship between exposure time and exposure level.

35. The method of claim 34, wherein a trading relationship is selected between approximately 3 dB to approximately 6 dB for doubling exposure time.

36. The method of claim 33, wherein sampling an input sound signal comprises sampling at selected frequency bands.

37. The method of claim 33, wherein sampling an input sound signal comprises sampling at selected sampling rates.

38. The method of claim 33, wherein the input sound signal is from a public switched telephone network.

39. The method of claim 33, further comprising:

digitizing the input sound signal at sampled frequencies.

40. The method of claim 33, wherein calculating the headset sound level comprises using a transfer function that includes a headset speaker frequency response factor, a headset electrical sensitivity factor, and a free field equivalency factor.

41. The method of claim 33, wherein extrapolating the real-time exposure to the end of a preselected time period comprises calculating a rate of exposure change.

42. The method of claim 33, further comprising:

determining real-time levels of impulse noise and continuous noise.

43. A method for controlling noise exposure from a headset comprising:

sampling an input sound signal to produce a plurality of samples as a function of time;

calculating from said plurality of samples a headset sound level corresponding to the input sound signal;

calculating real-time exposure of a user of the headset to the headset sound level;

extrapolating the real-time exposure to the end of a preselected time period;

calculating a gain adjustment for the input sound signal including comparing extrapolated exposure to regulatory threshold levels; and adjusting gain of the input sound signal in conformity with the gain adjustment calculation.

44. The method of claim 43, wherein adjusting gain of the input sound signal is carried out immediately for a small gain adjustment and is carried out over a longer time frame for a large gain adjustment.

45. The method of claim 44, wherein a small gain adjustment is in the range of approximately 1 dB to approximately 2 dB.

46. The method of claim 44, wherein a large gain adjustment is in the range of approximately 3 dB to approximately 6 dB.

47. The method of claim 43, wherein calculating a gain adjustment for the input sound signal comprises determining a time frame for gain adjustment depending upon the magnitude of the gain adjustment.

48. The method of claim 43, further comprising:

selecting calculation parameters comprising regulatory threshold levels, time periods, headset apparatus type, and user gain adjustment levels.

49. The method of claim 43, further comprising:

visually displaying sound measurement values comprising impulse noise, continuous noise, exposure levels, and gain adjustments.

* * * * *